(12) United States Patent
Froschmeier et al.

(10) Patent No.: US 8,947,859 B2
(45) Date of Patent: Feb. 3, 2015

(54) MODULAR POWER DISTRIBUTOR

(75) Inventors: Hubert Froschmeier, Dorfen (DE); Peter Fussl, Vilsbiburg (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 332 days.

(21) Appl. No.: 13/393,725

(22) PCT Filed: Aug. 26, 2010

(86) PCT No.: PCT/EP2010/062469
§ 371 (c)(1),
(2), (4) Date: May 15, 2012

(87) PCT Pub. No.: WO2011/026780
PCT Pub. Date: Mar. 10, 2011

(65) Prior Publication Data
US 2012/0228929 A1  Sep. 13, 2012

(30) Foreign Application Priority Data
Sep. 3, 2009 (DE) .......................... 10 2009 029 166

(51) Int. Cl.
| | |
|---|---|
| H02B 1/00 | (2006.01) |
| H01R 12/00 | (2006.01) |
| B60L 1/00 | (2006.01) |
| B60R 16/023 | (2006.01) |
| H02B 7/00 | (2006.01) |

(52) U.S. Cl.
CPC .............. B60R 16/0238 (2013.01); H02B 7/00 (2013.01)
USPC ........................... 361/601; 307/9.1; 439/76.2

(58) Field of Classification Search
CPC ....... H05K 5/0021; H05K 7/1442; H02B 1/04
See application file for complete search history.

(56) References Cited

U.S. PATENT DOCUMENTS

| | | | |
|---|---|---|---|
| 5,428,535 A | | 6/1995 | Katsumata et al. |
| 5,581,130 A | * | 12/1996 | Boucheron ................. 307/10.1 |
| 5,629,831 A | * | 5/1997 | Eggert et al. ................. 361/624 |
| 6,015,302 A | * | 1/2000 | Butts et al. .................. 439/76.2 |

(Continued)

FOREIGN PATENT DOCUMENTS

| | | |
|---|---|---|
| DE | 44 23 434 C1 | 7/1994 |
| DE | 101 56 233 A1 | 3/2003 |
| DE | 699 14 670 T2 | 1/2005 |
| DE | 10 2007 011 243 A1 | 11/2007 |

(Continued)

Primary Examiner — Gregory Thompson
(74) Attorney, Agent, or Firm — Wolf, Greenfield & Sacks, P.C.

(57) ABSTRACT

A power distributor for use in vehicles is provided. The power distributor includes a base module having a central power feed and at least two universal modules, thereby forming a modular structure of the power distributor. The universal modules have defined geometries and are mechanically and electrically removably connectable to corresponding locations on the base module. Each universal module includes at least one electrical component. The base module includes a printed circuit board having at least one of current conducting paths and at least one bus bar. The base module comprises contact connectors for connection to loads of the vehicle. An electrical component is also provided as a semi-finished product for further processing in vehicles. The electrical component includes a bus bar and a lamellar contact attached thereto.

20 Claims, 7 Drawing Sheets

(56) References Cited

U.S. PATENT DOCUMENTS

| | | |
|---|---|---|
| 6,159,033 A | 12/2000 | Oka |
| 6,314,854 B1 | 11/2001 | Fritz et al. |
| 6,402,530 B1 * | 6/2002 | Saito et al. .................. 439/76.2 |
| 2002/0009927 A1 | 1/2002 | Berberich et al. |
| 2002/0028590 A1 | 3/2002 | Saito et al. |
| 2009/0091183 A1 | 4/2009 | Lopes et al. |

FOREIGN PATENT DOCUMENTS

| | | |
|---|---|---|
| EP | 0 818 356 A2 | 1/1998 |
| EP | 0 972 682 A1 | 1/2000 |
| EP | 1 029 743 A2 | 8/2000 |
| EP | 1 179 453 A2 | 2/2002 |
| EP | 1 950 096 A1 | 7/2008 |

* cited by examiner

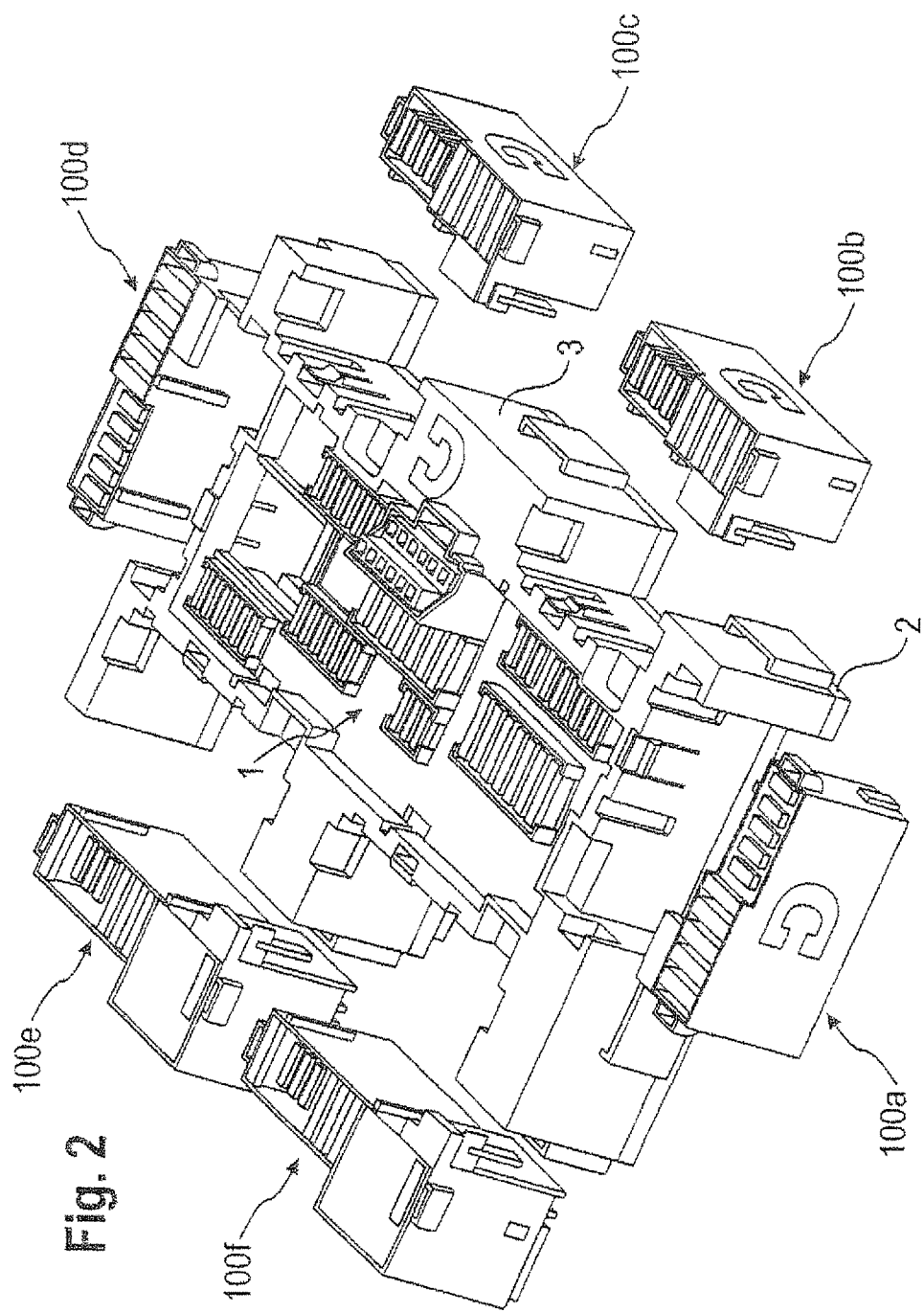

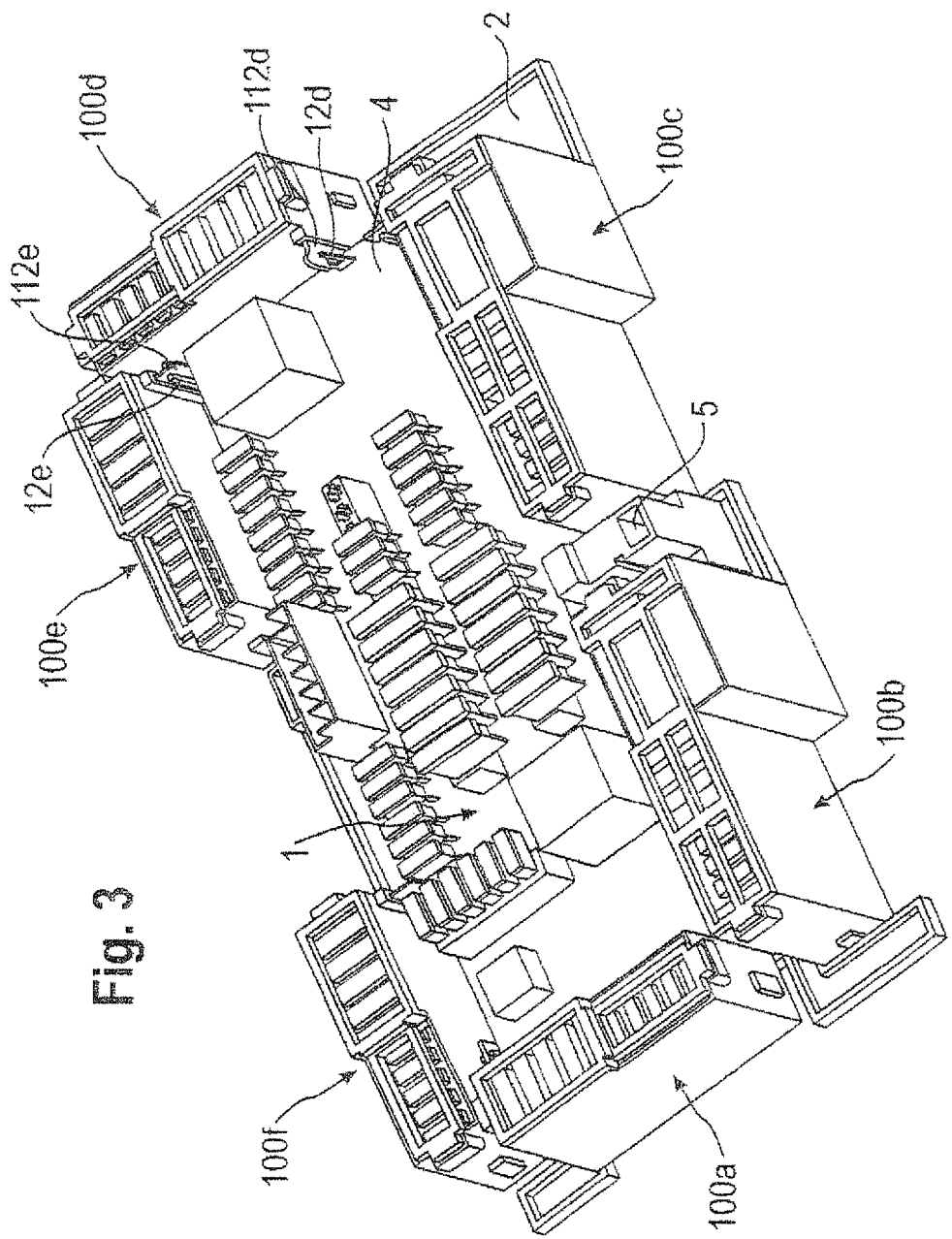

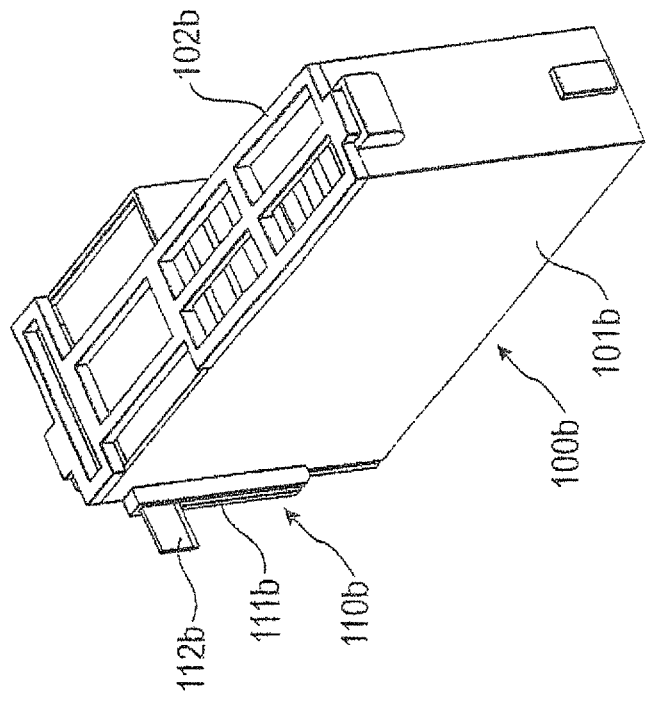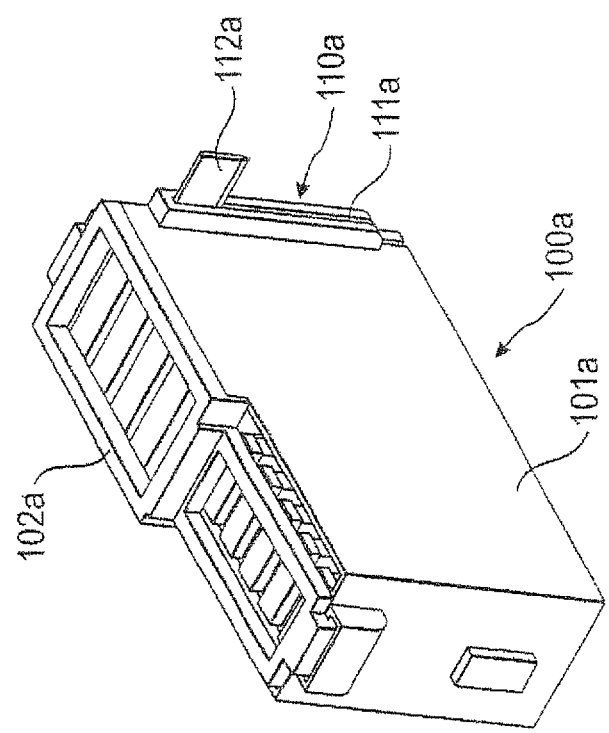

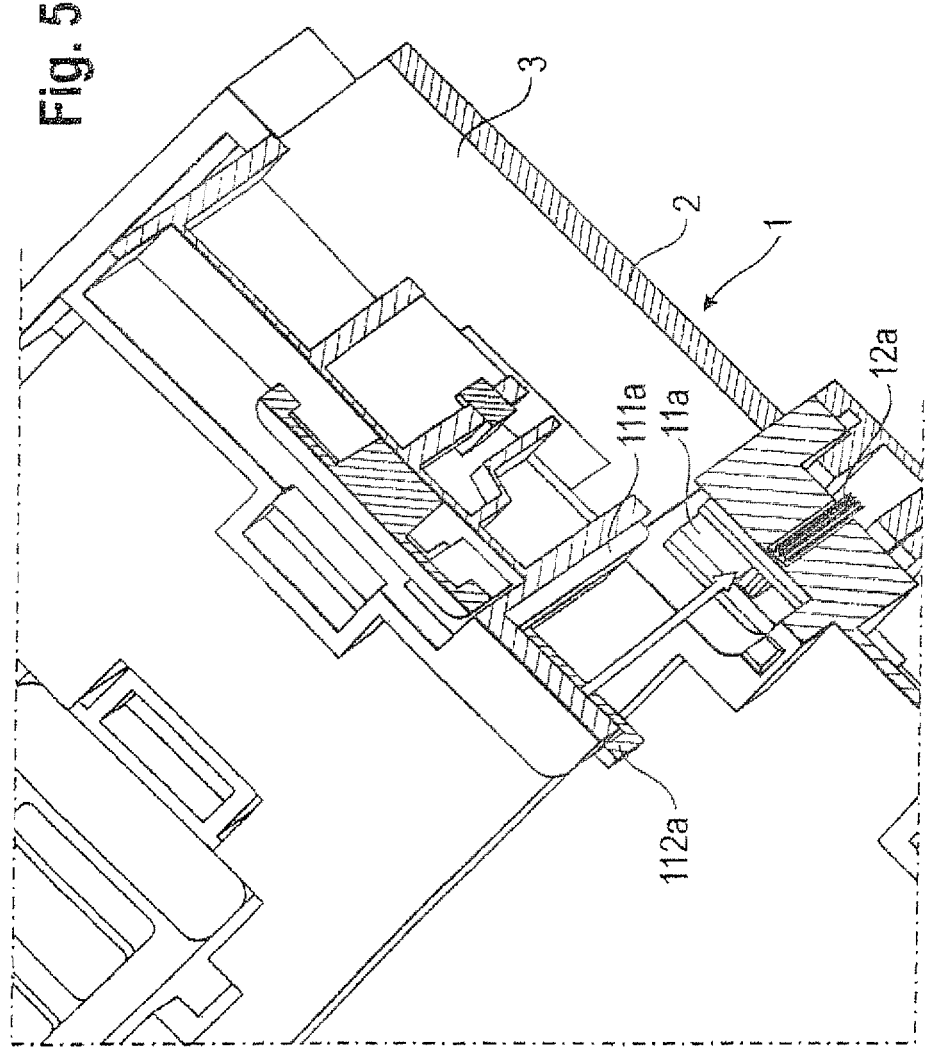

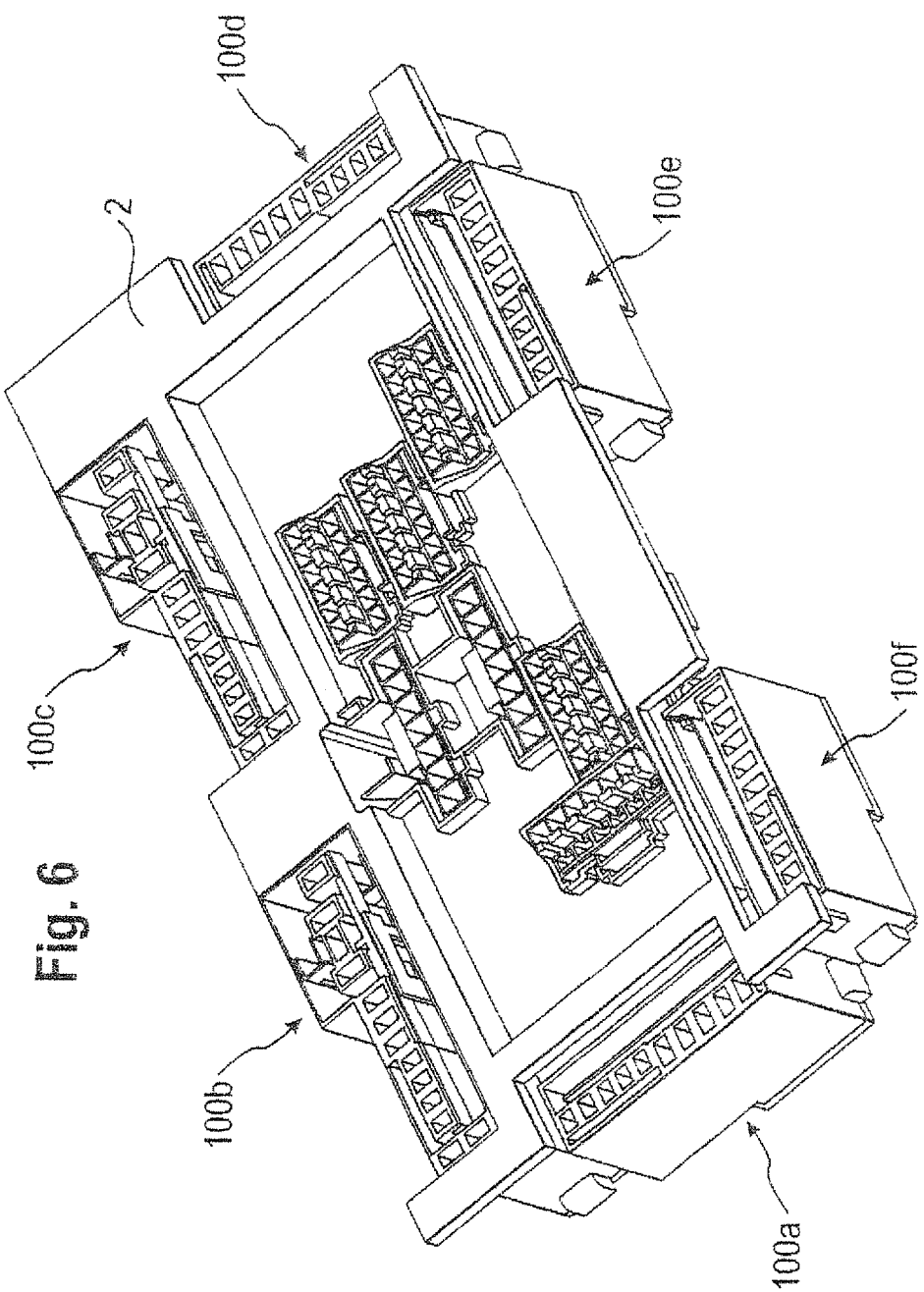

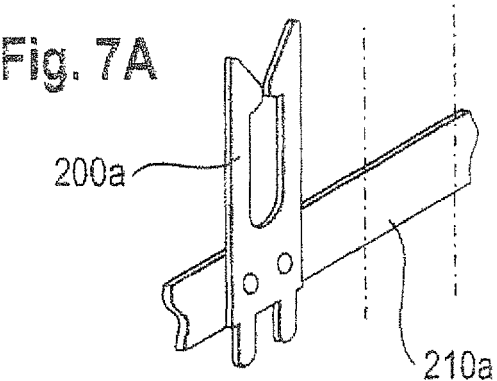
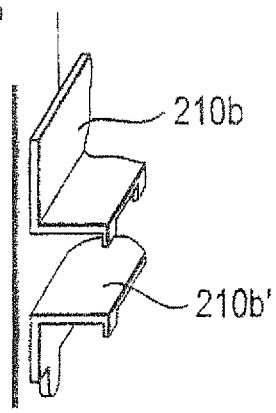
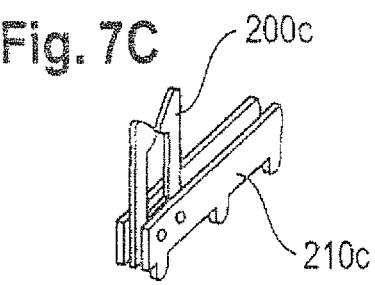
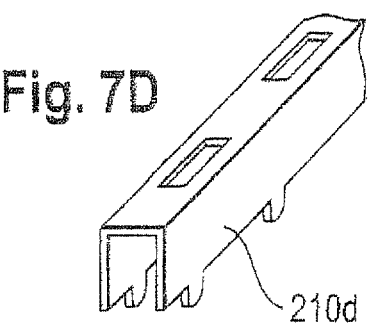
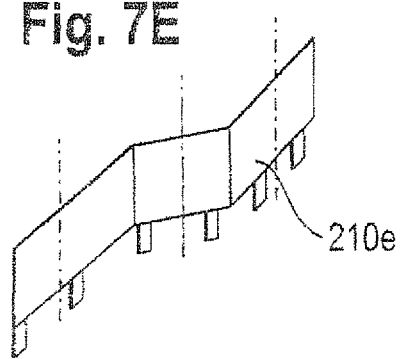

MODULAR POWER DISTRIBUTOR

RELATED CASE INFORMATION

This application is a 371 US National Stage Application of International Application No. PCT/EP2010/062469, filed on Aug. 26, 2010, claiming priority to German application no. DE 10 2009 029 166.0, filed on Sep. 3, 2009, the entire disclosures of which are incorporated herein by reference.

TECHNICAL FIELD

The present invention relates to a power distributor for use in vehicles, comprising a base module having a central power feed, and comprising at least two universal modules that can be removably attached to the base module. The invention further relates to an electrical component, which can be used as a semi-finished product for the power distributor according to the invention.

BACKGROUND OF THE INVENTION

Power distributors of the type mentioned constitute nodal points for the electrical network in motor vehicles. They contain a plurality of connectors for connection to loads and/or to one or more wiring harnesses, at least one power feed and, possibly, various electrical elements such as, for example, fuses, relays or electronic elements.

Known from EP 0 972 682 B1 is a central electrical system for motor vehicles, which has a main device and secondary devices that can be electrically and mechanically coupled thereto. The main device has a conductor channel, running parallel to its longitudinal extent, designed to receive electrical conductors, coupling points for connecting the secondary devices being provided on one longitudinal side of the conductor channel. The secondary devices are of a compatible design, and the coupling points on the main device are realized so as to be identical, such that the secondary devices can be connected to any coupling point. The secondary devices each have at least one fuse. Routed in the conductor channel of the main device are a plurality of electrical conductors at differing potential.

The central electrical system disclosed in EP 0 972 682 B1 constitutes the preamble of Claim 1. A comparable circuit arrangement is given by EP 0 495 422 A2.

EP 0 972 682 B1 describes as an object the creation of a central electrical system whose main device enables associated secondary devices to be electrically and mechanically coupled thereto in a flexible and modular manner, such that each secondary device designed for coupling to the main device can be assigned to any free coupling point.

The above modularization and greater flexibility, however, increase the space requirement and the number of components to be used. The reason for this is that the central electrical system is not optimized to a particular application, for example a particular equipment variant, in respect of the interconnection of differing electrical elements.

BRIEF DESCRIPTION OF THE INVENTION

An object of the invention therefore consists in creating a modular power distributor for use in vehicles, wherein as many shared parts as possible are used whilst retaining the flexibility, the number of components required can be reduced and the compactness can be improved.

The object is achieved with a power distributor according to Claim 1 and an electrical component according to Claim 10. Advantageous designs are given by the corresponding dependent claims.

The power distributor has a base module comprising at least one central power feed. The universal modules have defined geometries, and are removably connected, both mechanically and electrically, to the base module at points provided for this purpose. The universal modules can be of individual design in respect of the electrical components contained therein, again with the connected loads (for example, special equipment, trailer coupling) being taken into account. It is to be pointed out that "electrical components" refer to the components usually provided in power distributors for vehicles, such as, for instance, fuses, relays or electronic modules such as, for example, logic modules. According to the invention, the base module comprises, in addition to the central power feed, at least one printed circuit board and/or one power bus bar (for example, realized as a leadframe) having current-conducting paths, as well as contact connectors for connection to loads of the vehicle and/or for connection to one or more wiring harnesses.

The base module thus contains mechanical and electrical components that are necessary and that therefore can be used jointly by the various universal modules in a plurality of applications, for example in each equipment variant of a vehicle. In this way, it is possible to reduce the number of elements used and to make the power distributor more compact, without the need to dispense with the advantageous flexibility and modularity. In the case of the power distributor according to the invention, the modular structure of the power distributor, having many shared parts, creates a product that can be expanded by various add-on universal modules, according to the equipment of the vehicle, starting from a basic equipment.

Preferably, the printed circuit board of the base module comprises electrical components such as, for example, fuses, relays or other electronic modules. The number of components used jointly by the universal modules is thus increased and the compactness of the power distributor is further improved.

Preferably, a plurality of universal modules or all universal modules have identically realized interfaces for mechanical and electrical connection to the base module, in order to increase the number of shared parts used and thereby to improve the modularity of the power distributor. In an advantageous development of such a design, a plurality of universal modules or all universal modules have not only defined geometries, but identical geometries, at least in the connection region. Such identical geometries can be achieved through jointly used housing forms and/or connection variants. The interfaces between the base module and universal modules can be realized such that a universal module can be attached to any free interface on the base module or to an interface defined for its function.

Preferably, the electrical and mechanical contacting of the universal modules is effected in recesses of the base module that are provided for this purpose. Because of this measure, the power distributor is more compact and the universal modules can be more securely connected to the base module.

Preferably, the mechanical connection between the universal modules and the base module is effected via guides, it being possible to provide in each base module at least one pin that can be brought into engagement with a corresponding opening in the corresponding universal module, in order to achieve a defined end lock-in point that is perceptible during assembly. The guide and the pin can be, but need not be, provided jointly. The pin can extend into or through the opening and, in addition to defining an end lock-in point, provides for improved guidance. The corresponding universal module can thus be removably attached to the base module in a secure and defined manner, thereby minimizing the probability of damage to the mechanical and/or electrical interface during the attachment and/or removal process.

Preferably, the electrical contact between the universal modules and the base module is effected via a blade contact on the universal module and via a lamellar contact at the point on the base module that is provided for contacting. Such a connection is reliable in the case of a compact design, and can be produced with a small number of components. Clearly, depending on the function of the universal module, it is possible to provide a plurality of blade contacts on the universal module and a plurality of lamellar contacts at a connection point of the base module.

Since, depending on the connected loads on the printed circuit board of the base module or upon connection of the universal modules, there might be a need for high current-carrying capacities for which the conductor paths provided on the printed circuit board might possibly not be adequately dimensioned, it is provided, preferably, that the number of lamellar contacts necessary for contacting is disposed on a bus bar. The electrical component consisting of at least one lamellar contact and a bus bar is designed such that the current-carrying capacity required for the corresponding load or loads is achieved. For this purpose, a stack of lamellar contacts can be connected to a bus bar that is appropriately dimensioned for the required current-carrying capacity, which bus bar, in turn, is connected to the printed circuit board, for example via ordinary solder pins or plug-in contacts. Various geometries are conceivable in this case for the design of the bus bar, for example a metal band, double rail, L-shaped, or U-shaped. The connection of the lamellar contacts to the bus bar can also be configured in such a way that the lamellar contacts are designed as push-in contacts.

Against the background of the modular design of the power distributor, the electrical component described above is suitable for expanding a power distributor according to the invention, but also a conventional power distributor or other electrical components, in a modular manner, such that the latter can be used for loads for which the power distributor according to the invention or the conventional power distributor or the other electrical component were not originally designed.

The above electrical component consisting of a bus bar and lamellar contact thus not only proves to be advantageous in combination with the power distributor according to the invention, but, as a semi-finished product, it makes it possible to expand electrical components in a modular manner and thereby to expand their technical specifications. For this purpose, one or more lamellar contacts, or a stack of lamellar contacts is/are connected to a bus bar that is appropriately dimensioned for the required current-carrying capacity, and the bus bar is shaped accordingly or is provided with suitable predetermined bend points before the bus bar is connected to the printed circuit board. This aspect relates to a method for expanding an electrical component with the electrical component consisting of a bus bar and lamellar contact.

BRIEF DESCRIPTION OF THE DRAWINGS

Exemplary embodiments of the invention are explained in the following with reference to appended figures.

FIG. 2 shows a modular power distributor, consisting of a base module and six universal modules.

FIG. 3 provides a view into the base module, a printed circuit board of the base module being visible.

FIGS. 4A and 4B are individual representations of two universal modules.

FIG. 5 shows the insertion and contacting of a universal module into the base printed circuit board.

FIG. 6 shows an oblique bottom view of the bottom plate of the base module.

FIGS. 7A to 7E show various embodiments of bus bars, some in combination with a lamellar contact.

WAYS OF IMPLEMENTING THE INVENTION

Figure 1A:
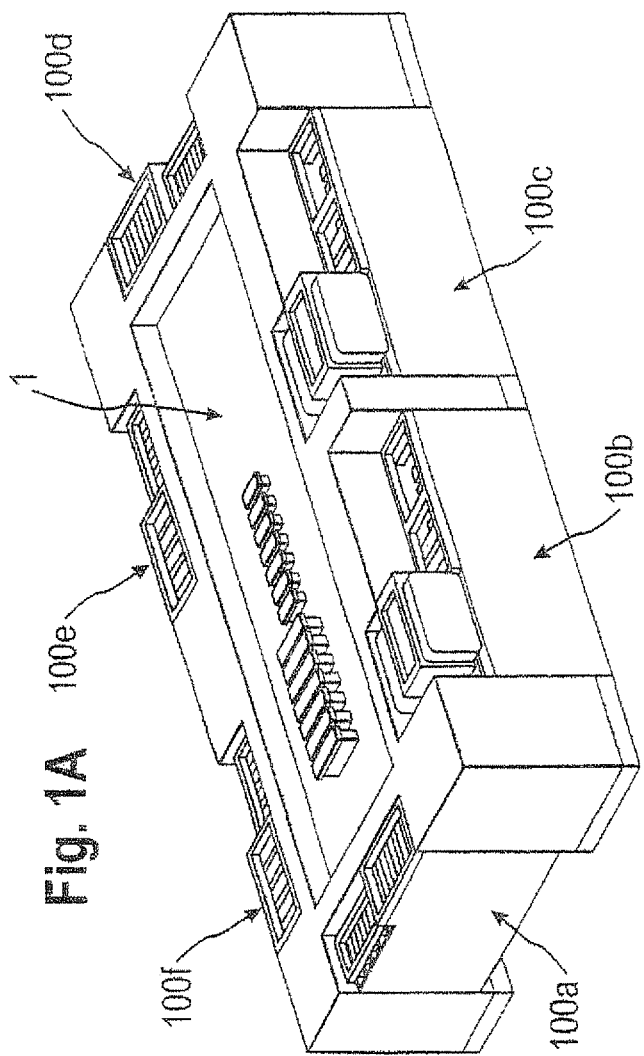
FIG. 1A shows an oblique top view of a modular power distributor.
Figure 1B:
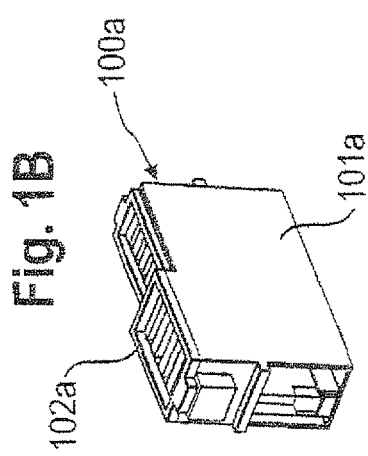
FIGS. 1B and 1C are two individual representations of two differing universal modules.
Figure 1C:
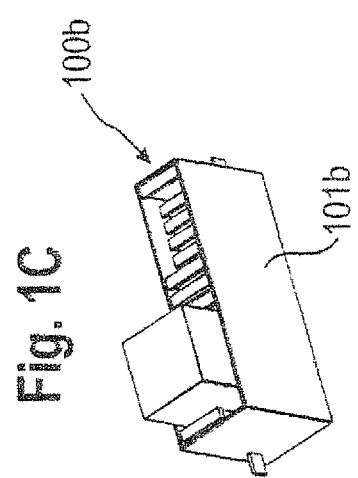

FIG. 1A shows a perspective, oblique top view of a modular power distributor. The power distributor has a base module 1 and a plurality of universal modules 100a to 100f, which are removably attached to the base module 1. FIGS. 1B and 1C shows individual representation of two universal modules 100a and 100b. The universal modules 100a and 100b each have a housing 101a and 101b, respectively, and have a cover 102a. The cover has been omitted from FIG. 1C, in order to provide a view into the inside of the universal module 100b.

FIG. 2 shows a representation of universal modules 100a to 100f that have been separated from the base module 1. The base module has a bottom plate 2 and an enclosure 3. As shown by the figures, both the base module 1 and the universal modules 100a to 100f comprise electrical components (e.g. fuses, relays, etc.) and/or electronic components such as, for instance logic components.

FIG. 3 provides a view into the inside of the base module 1, a printed circuit board 4 being provided on the bottom plate 2. Not represented here are circuit-board conductors or bus bars for contacting the electrical/electronic components. The figure shows the contacting of the universal modules 100a to 100f via a blade contact on the printed circuit board 4 and a lamellar contact at the corresponding point on the base module 1. For the universal modules 100d and 100e, the blade contacts are denoted exemplarily in the figure by 112d and 112e. The corresponding lamellar contacts for receiving the blade contacts are denoted by 12d and 12e. The reference 5 denotes the central power feed of the power distributor.

FIGS. 4A and 4B are individual representations of two universal modules 100a and 100b. Provided on both universal modules 100a and 100b there is a respective portion 110a and 110b for electrical and mechanical connection to the base module 1. The portions for electrical and mechanical connection 110a and 110b each have a mechanical guide 111a and 111b, respectively, and have blade contacts 112a and 112b, respectively. The operation of effecting a connection between the universal module 100a and the base module 1 is shown by FIG. 5. This figure shows how the universal module 100a is brought into connection with the base module by being pushed into a recess of the base module, by means of the guide 111a and a corresponding slide piece 11a on the base module 1. The blade contact 112a of the universal module 100a thereby comes into engagement with the lamellar contact 12a.

FIG. 6 is a perspective, oblique bottom view of the bottom plate of the base module. The connectors represented, both on the bottom plate and on the underside of the universal modules 100a to 100f, are used to effect contacting to the wiring harness and the loads.

For the purpose of adapting and/or expanding the technical specifications of the power distributor, FIGS. 7A to 7E show various embodiments of bus bars 210a to 210e, some of which are connected to lamellar contacts 200*a* and 200*c*. The bus bars 210*a* to 210*e* can be connected by means of ordinary solder pins and/or plug-in contacts and/or by means of other contacts on the printed circuit board and/or to the universal modules. Thus, depending on the connected loads on the base printed circuit board, i.e. the printed circuit board on the base module, or upon connection of the universal modules, it is possible to realize differing current-carrying capacities, including high capacities, for which the conductor paths provided on the printed circuit board are not adequately dimensioned.

Various geometries are conceivable for the design of the bus bars. The bus bar can be realized, for example, as a metal band (FIG. 7A), a double rail (FIGS. 7E and 7C), as an L shape (FIG. 7B), or as a U shape (FIG. 7D). In some of the FIGS. 7A to 7E, connection points are provided for connecting the bus bars and/or lamellar contacts to connection points on the power distributor that are provided for this purpose.

The invention claimed is:

1. A power distributor for use in vehicles, the power distributor comprising a base module having a central power feed and comprising at least two universal modules, thereby forming a modular structure of the power distributor, the universal modules having defined geometries, and being mechanically and electrically removably connectable to corresponding locations on the base module, each universal module containing at least one electrical component, wherein the base module comprises a printed circuit board having at least one of current-conducting paths and at least one bus bar, and wherein the base module comprises contact connectors for connection to loads of the vehicle,
wherein the mechanical connection between the universal modules and the base module is provided via guides, wherein each base module has at least one pin for each universal module engageable with a corresponding opening in the corresponding universal module by extending into or through said opening.

2. The power distributor according to claim 1, wherein the printed circuit board of the base module comprises electrical components.

3. The power distributor according to claim 1, wherein at least some of the universal modules have identical interfaces constructed and arranged to mechanically and electrically connect to the base module.

4. The power distributor according to claim 1, wherein the base module includes recesses adapted to receive the electrical and mechanical connection of the universal modules.

5. The power distributor according to claim 1, wherein the electrical contact between the universal modules and the base module is provided by at least one blade contact on the universal module and a corresponding at least one lamellar contact on the base module.

6. The power distributor according to claim 5, wherein at least one of the lamellar contacts is fastened to a bus bar provided in or on the base module.

7. The power distributor according to claim 6, wherein the bus bar is connected to the printed circuit board via soldered connections or plug-in contacts.

8. The power distributor according to claim 6, wherein the bus bar comprises at least one of an L shape, a metal band, a double rail and a U shape.

9. An electrical component as a semi-finished product for subsequent processing in vehicle manufacturing, the electrical component comprising a bus bar and a lamellar contact attached thereto, wherein the bus bar comprises at least one of a double rail and a U shape.

10. The electrical component according to claim 9, wherein the electrical component can be connected as a module, via soldered connections or plug-in contacts, to a printed circuit board of a power distributor, the power distributor comprising a base module having a central power feed and comprising at least two universal modules, thereby forming a modular structure of the power distributor, the universal modules having defined geometries, and being mechanically and electrically removably connectable to corresponding locations on the base module, each universal module containing at least one electrical component, wherein the base module comprises a printed circuit board having at least one of current-conducting paths and/or at least one bus bar, wherein the base module comprises contact connectors for connection to loads of the vehicle.

11. The electrical component according to claim 9, wherein the bus bar comprises at least one of an L shape and a metal band.

12. The electrical component according to claim 9, wherein the lamellar contact is configured as a push-in contact.

13. The electrical component according to claim 9 wherein the bus bar has a plurality of lamellar contacts fastened thereto.

14. A power distributor for use in vehicles, the power distributor comprising a base module having a central power feed and comprising at least two universal modules, thereby forming a modular structure of the power distributor, the universal modules having defined geometries, and being mechanically and electrically removably connectable to corresponding locations on the base module, each universal module containing at least one electrical component, wherein the base module comprises a printed circuit board having at least one of current-conducting paths and at least one bus bar, and wherein the base module comprises contact connectors for connection to loads of the vehicle,
wherein the electrical contact between the universal modules and the base module is provided by at least one blade contact on the universal module and a corresponding at least one lamellar contact on the base module.

15. The power distributor according to claim 14, wherein the printed circuit board of the base module comprises electrical components.

16. The power distributor according to claim 14, wherein at least some of the universal modules have identical interfaces constructed and arranged to mechanically and electrically connect to the base module.

17. The power distributor according to claim 14, wherein the base module includes recesses adapted to receive the electrical and mechanical connection of the universal modules.

18. The power distributor according to claim 14, wherein at least one of the lamellar contacts is fastened to a bus bar provided in or on the base module.

19. The power distributor according to claim 18, wherein the bus bar is connected to the printed circuit board via soldered connections or plug-in contacts.

20. The power distributor according to claim 18, wherein the bus bar comprises at least one of an L shape, a metal band, a double rail and a U shape.

* * * * *